(12) United States Patent  (10) Patent No.: US 8,608,119 B2
Wolff et al.  (45) Date of Patent: Dec. 17, 2013

(54) DISPLAY STAND

(75) Inventors: Stacy Wolff, Cypress, TX (US);
Memphis-Zhihong Yin, Tomball, TX (US); Paul Doczy, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1043 days.

(21) Appl. No.: 10/998,333

(22) Filed: Nov. 23, 2004

(65) Prior Publication Data
US 2006/0108483 A1  May 25, 2006

(51) Int. Cl.
*A47F 5/00* (2006.01)
*G06F 1/16* (2006.01)

(52) U.S. Cl.
USPC ............ 248/123.2; 248/292.11; 248/917; 361/679.22; 349/58; D14/376

(58) Field of Classification Search
USPC ........... 248/122.1, 124.1, 917, 371, 372, 396, 248/127, 130, 135, 123.11, 123.2, 161, 248/125.2, 346.01, 441.1, 274.1; 361/681, 361/683, 682, 686, 679.22, 679.59; 349/58, 349/60; 359/809, 810, 815, 817; D14/375, D14/376, 451
See application file for complete search history.

(56) References Cited

U.S. PATENT DOCUMENTS

| 4,657,214 | A |  | 4/1987 | Foster |
| 4,669,694 | A |  | 6/1987 | Malick |
| 4,944,481 | A | * | 7/1990 | Yurchenco et al. ........ 248/372.1 |
| 5,335,142 | A |  | 8/1994 | Anderson |
| 5,384,686 | A |  | 1/1995 | Mesfin et al. |
| 5,553,820 | A |  | 9/1996 | Karten et al. |
| 5,918,841 | A |  | 7/1999 | Sweere et al. |
| 5,953,052 | A | * | 9/1999 | McNelley et al. ......... 348/14.16 |
| 6,024,335 | A |  | 2/2000 | Min |
| 6,031,714 | A | * | 2/2000 | Ma .............................. 361/681 |
| 6,134,103 | A |  | 10/2000 | Ghanma |
| 6,256,193 | B1 | * | 7/2001 | Janik et al. .................... 361/683 |
| 6,266,241 | B1 | * | 7/2001 | Van Brocklin et al. ....... 361/687 |
| 6,315,259 | B1 |  | 11/2001 | Kolb |
| 6,353,529 | B1 | * | 3/2002 | Cies ............................. 361/681 |
| 6,354,552 | B1 |  | 3/2002 | Chiu |
| 6,366,452 | B1 |  | 4/2002 | Wang et al. |
| 6,392,877 | B1 | * | 5/2002 | Iredale ......................... 361/683 |
| 6,430,038 | B1 | * | 8/2002 | Helot et al. ................... 361/681 |

(Continued)

FOREIGN PATENT DOCUMENTS

CN 2513154 9/2002
CN 1469218 1/2004

(Continued)

OTHER PUBLICATIONS

DE Office Action, Appl No. 102005051283.6, date of mailing Apr. 16, 2012, 4 p.

(Continued)

*Primary Examiner* — Tan Le

(57) ABSTRACT

A display stand comprises a mounting element couplable to a display element and a first support member coupled to the mounting element to enable angular movement of the display element relative to the first support member. The display stand also comprises a second support member rotatably coupled to the first support member to enable elevational movement of the display element relative to the second support member.

12 Claims, 3 Drawing Sheets

(56) References Cited

U.S. PATENT DOCUMENTS

| | | | |
|---|---|---|---|
| 6,502,792 B1 | 1/2003 | Cho et al. | |
| 6,556,435 B1 * | 4/2003 | Helot et al. | 361/686 |
| 6,727,961 B2 | 4/2004 | Yang | |
| 6,987,666 B2 * | 1/2006 | Medica et al. | 361/681 |
| 6,989,948 B2 * | 1/2006 | Hussaini et al. | 359/809 |
| 7,143,478 B2 * | 12/2006 | Quijano | 248/917 |
| 7,258,311 B2 * | 8/2007 | Yen et al. | 248/133 |
| 2003/0001057 A1 | 1/2003 | Sweere et al. | |
| 2003/0034952 A1 | 2/2003 | Wang et al. | |
| 2003/0075649 A1 | 4/2003 | Jeong et al. | |
| 2004/0190236 A1 | 9/2004 | Medica et al. | |
| 2004/0211866 A1 * | 10/2004 | Jung et al. | 248/133 |
| 2005/0077439 A1 | 4/2005 | Quijano | |

FOREIGN PATENT DOCUMENTS

| | | |
|---|---|---|
| DE | 44 28 937 A1 | 2/1996 |
| EP | 0230236 | 1/1987 |
| EP | 1148409 | 10/2001 |
| EP | 1229286 | 8/2002 |
| GB | 2206464 | 1/1989 |

OTHER PUBLICATIONS

JP Office Action, Questioning, Appln No. P2005-329916, date of dispatch Apr. 19, 2011, 3 p.

* cited by examiner

DISPLAY STAND

BACKGROUND

Computer display stands for supporting a computer display, such as a flat panel display or cathode ray tube (CRT), generally include a platform on which the computer display is seated. However, present computer display stands generally do not accommodate particular users and/or particular workstation applications. For example, different users generally desire different ergonomic workstation settings.

SUMMARY OF THE INVENTION

In accordance with one embodiment of the present invention, a display stand comprises a mounting element couplable to a display element and a first support member coupled to the mounting element to enable angular movement of the display element relative to the first support member. The display stand also comprises a second support member rotatably coupled to the first support member to enable elevational movement of the display element relative to second support member.

In accordance with another embodiment of the present invention, a display stand comprises a mounting element couplable to a display element and a first hinge assembly adapted to rotatably couple the mounting element to a first support member. The computer display stand also comprises a second hinge assembly adapted to rotatably couple the first support member to a second support member.

In accordance with yet another embodiment of the present invention, a display stand comprises a first support member adapted to pivotally support a display element and a second support member having at least a portion thereof disposed spaced apart from the first support member for receiving at least a portion of a portable computer therebetween. The first support member is movable relative to the second support member to facilitate elevational movement of the display element relative to the second support member.

BRIEF DESCRIPTION OF THE DRAWINGS

For a more complete understanding of the present invention and the advantages thereof, reference is now made to the following descriptions taken in connection with the accompanying drawings in which.

DETAILED DESCRIPTION OF THE DRAWINGS

Figure 1:
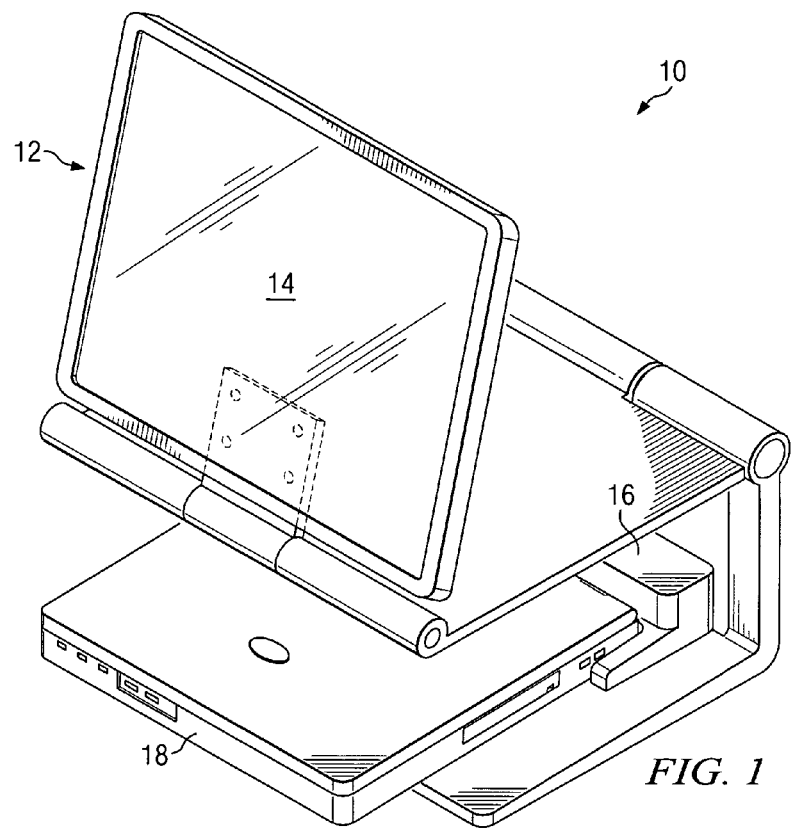
FIG. 1 is a diagram illustrating an embodiment of a computer display stand in accordance with the present invention.
Figure 2:
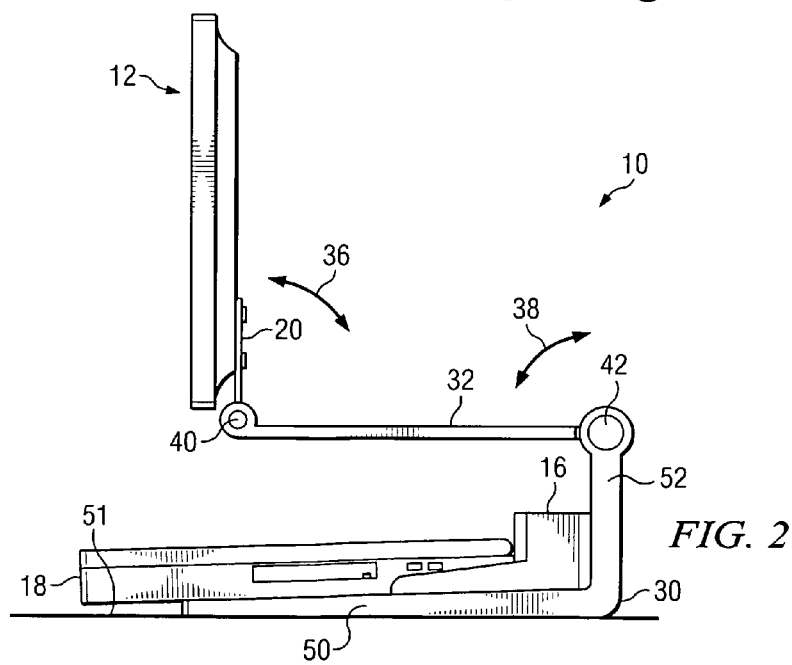
FIG. 2 is diagram illustrating a side view of the embodiment of the computer display stand illustrated in FIG. 1.

The preferred embodiments of the present invention and the advantages thereof are best understood by referring to FIGS. 1-3 of the drawings, like numerals being used for like and corresponding parts of the various drawings.

FIG. 1 is a diagram illustrating an embodiment of a display stand 10 in accordance with the present invention. In the embodiment illustrated in FIG. 1, display stand 10 is adapted to provide a variety of ergonomic positions for a display element 12. In the embodiment illustrated in FIG. 1, display element 12 comprises a flat panel display monitor or screen 14 (e.g., a liquid crystal display (LCD) type device). However, it should be understood that other types of visual display devices may be used as display element 12. In the embodiment illustrated in FIG. 1, display stand 10 also comprises a docking station 16 for docking a portable computer device 18, such as, but not limited to, a laptop or notebook computer. However, it should be understood that display stand 10 may also be configured without docking station 16.

FIG. 2 is a diagram illustrating a side view of display stand 10 illustrated in FIG. 1 in accordance with an embodiment of the present invention. In the embodiment illustrated in FIG. 2, display stand 10 comprises a mounting element 20 couplable to display element 12. Display element 12 may be coupled to mounting element 20 using a variety of different types of devices, mechanisms, or methods. For example, in some embodiments of the present invention, display element 12 may be coupled to mounting element 20 to facilitate convenient releasable engagement of display element 12 relative to mounting element 20. However, in other embodiments of the present invention, display element 12 is coupled to mounting element 20 in a more permanent configuration, such as via fasteners or other types of attachment devices.

In the embodiment illustrated in FIG. 2, display stand 10 comprises a base support member 30 and an elevated support member 32. Mounting element 20 is pivotally or rotatably coupled to elevated support member 32 via a barrel-type hinge assembly 40 to enable pivotal or rotational movement of display element 12 relative to elevated support member 32 in the direction indicated generally by 36, and elevated support member 32 is pivotally or rotatably coupled to base support member 30 via barrel-type hinge assembly 42 to enable pivotal or rotational movement of elevated support member 32 relative to base support member 30 in the direction indicated generally by 38. However, it should be understood that other types of devices or mechanisms may be used to provide pivotal or rotational movement of mounting element 20 relative to elevated support member 32, and pivotal or rotational movement of elevated support member 32 relative to base support member 30.

In the embodiment illustrated in FIG. 2, base support member 30 comprises an L-shaped support member 30 having a horizontal support portion 50 disposed on a support surface 51 (e.g., a desktop or workstation surface), and a vertical support portion 52 disposed perpendicular (perpendicular or substantially perpendicular) to base support portion 50. Thus, in the embodiment illustrated in FIG. 2, elevated support member 32 is pivotally or rotationally coupled to vertical support portion 52 of support member 30 via hinge assembly 42. However, it should be understood that other geometric configurations of base support member 30 may be used. Thus, in the embodiment illustrated in FIG. 2, display stand 10 is configured such that elevated support member 32 and at least a portion of base support member 30 (e.g., base support portion 50) are disposed spaced apart from each other such that at least a portion of portable computer 18 is disposed between at least a portion of elevated support member 32 and at least a portion of base support member 30, thereby providing a convenient location for docking portable computer 18. For example, as illustrated in FIG. 2, docking station 16 is disposed along a rearward portion of base support member 30 to facilitate docking of portable computer 18 below display element 12. In the embodiment illustrated in FIG. 2, at least a portion of base support member 30 is configured to support portable computer 18 while docked to docking station 16 (e.g., base support portion 50). However, it should also be understood that base support member 30 may be otherwise configured such that portable computer 18 may be docked to docking station 16 without being supported by base support member 30.

Figure 3A:
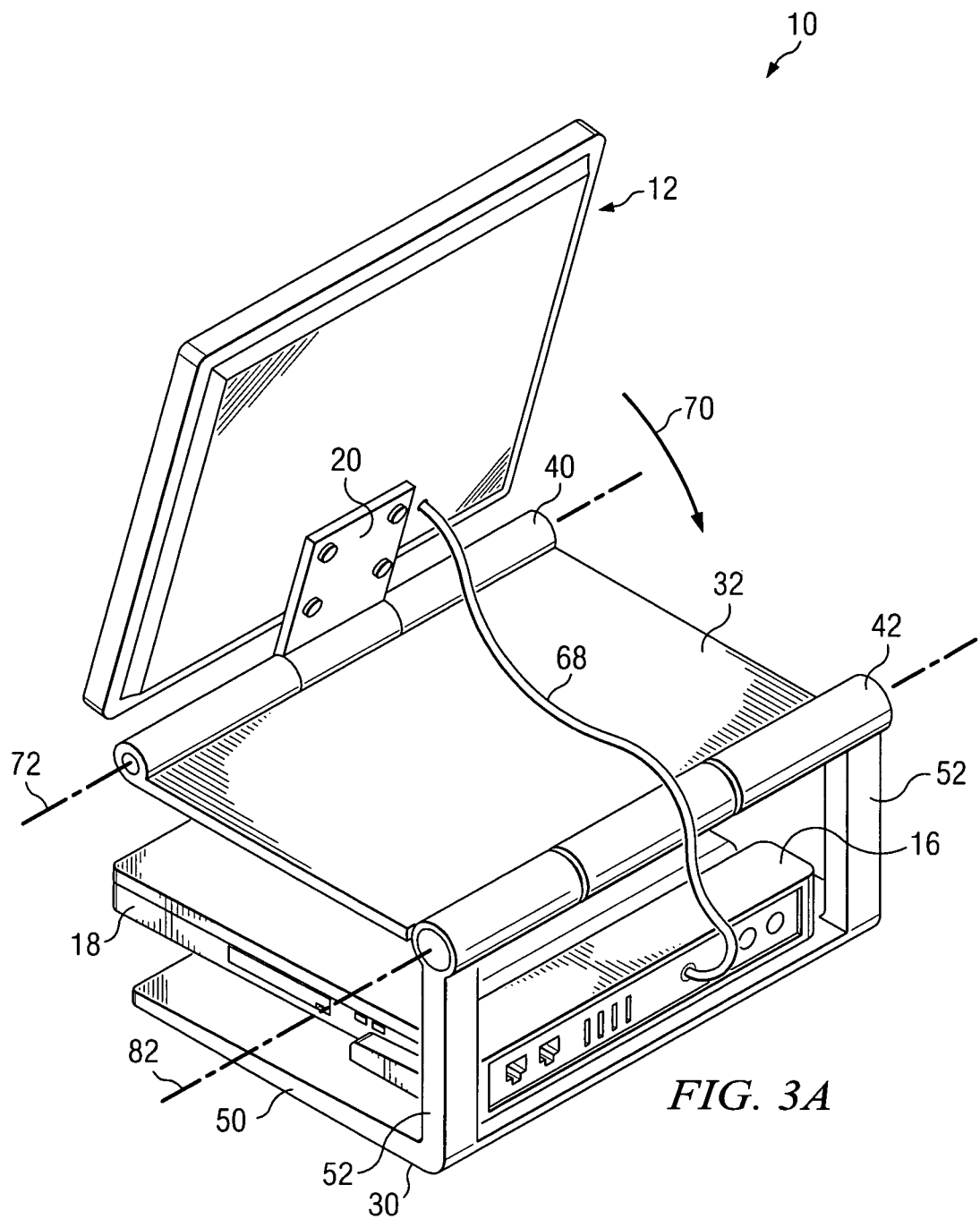
FIGS. 3A and 3B are diagrams illustrating two different positions of the embodiment of the computer display stand illustrated in FIGS. 1 and 2.
Figure 3B:
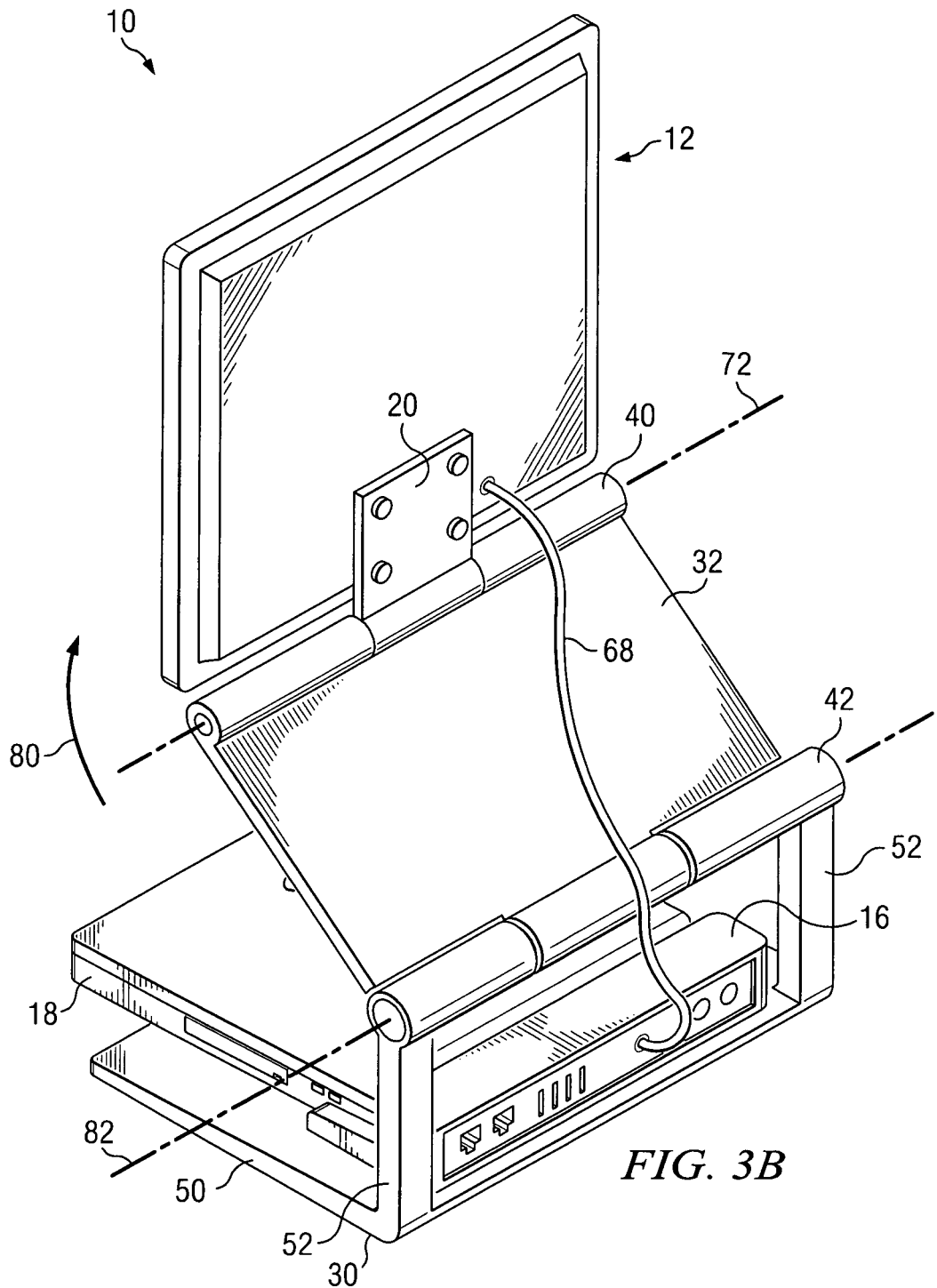

FIGS. 3A and 3B are diagrams illustrating different ergonomic positions of display stand 10 in accordance with an embodiment of the present invention. In the embodiment illustrated in FIGS. 3A and 3B, display element 12 is communicatively coupled to docking station 16 via a wired communication medium 68. However, it should be understood that display stand 10 may also be configured for wireless communications between docking station 16 and display element 12. As described above, mounting element 20 is pivotally or rotatably coupled to elevated support member 32 via hinge assembly 40 such that display element 12 may be rotated relative to elevated support member 32 in the direction indicated generally by 70 about an axis 72, thereby enabling display element 12 to be positioned at a variety of different viewing angles relative to a user of display element 12. Additionally, referring to FIG. 3B, elevated support member 32 is pivotally or rotatably coupled to base support member 30 via hinge assembly 42 to facilitate rotational movement of elevated support member 32 relative to base support member 30 in the direction indicated generally by 80 about an axis 82, thereby enabling elevational movement or positioning of display element 12 relative to support member 30 and/or a user of display stand 10. In the embodiment illustrated in FIGS. 1-3, angular and elevational movement of display element 12 is provided via rotational relationships and/or couplings between support members 30 and 32 and mounting element 20. However, it should be understood that angular and/or elevational movement of display element 12 may be otherwise provided (e.g., spherical ball-joint couplings, telescoping elements and/or stackable or couplable elements). For example, in the embodiment illustrated in FIGS. 1-3, base support member 30 is shown having an L-shaped configuration having elevated support member 32 rotatably coupled thereto. However, in other embodiments of the present invention, base support member 30 may be formed having other configurations (e.g., U-shaped and/or having elevated support member 32 formed as an integral component thereof such that hinge assembly 42 is omitted). In such embodiments of the present invention, for example, elevational movement of display element 12 may be provided by configuring vertical support portions 52 having a telescoping configuration, stackable or couplable elements at a location of vertical support portions 52, and/or otherwise. Thus, it should be understood that a variety of different configurations may be provided to provide elevational movement of display element 12.

Thus, embodiments of the present invention enable various ergonomic positions of display element 12 relative to a user of display stand 10, thereby accommodating a variety of types of workstation and/or user applications. For example, embodiments of the present invention enable a variety of different viewing angles of display element 12 relative to a user and elevational adjustment of display element 12 relative to a user. Further, embodiments of the present invention enable convenient access to docking station 16. For example, in some embodiments of the present invention, convenient access to docking station to dock or undock portable computer 18 is provided by enabling elevational adjustment of display element 12 and/or elevated support member 32 upwardly away from base support member 30 and/or docking station 16.

What is claimed is:

1. A display stand, comprising:
   a mounting element non-rotatably couplable to a display element;
   a first support member coupled to the mounting element to enable angular movement of the display element relative to the first support member;
   a second support member rotatably coupled to the first support member to enable elevational movement of the display element relative to the second support member; and
   a docking station located between the first and second support members, wherein the docking station provides a location for docking a portable computer.

2. The display stand of claim 1, wherein the second support member includes a horizontal support portion disposed on a support surface and a vertical support portion non-rotatably connected to the horizontal support portion such that the first support member and the horizontal support portion are spaced apart from each other to include the docking station that docks with the portable computer.

3. The display stand of claim 1, wherein the second support member comprises an L-shaped support member that includes a horizontal support portion non-rotatably connected to a vertical support portion.

4. The display stand of claim 1, wherein the display element and the docking station wirelessly communicate with each other.

5. The display stand of claim 1, wherein the docking station is disposed along rearward portion of the second support member to facilitate docking of the portable computer below the display element.

6. The display stand of claim 1, wherein the second support member is adapted to support the portable computer.

7. The display stand of claim 1, wherein the second support member is adapted to support at least a portion of the portable computer disposed between at least a portion of the second support member and at least a portion of the first support member.

8. A display stand, comprising:
   a mounting element non-rotatably coupled to a display element;
   a first support member adapted to pivotally support the mounting element;
   a second support member having an L-shape and being coupled to the first support member; and
   a docking station located in a space created between the first support member and the second support member, wherein at least a portion of the second support member is disposed spaced apart from the first support member to create the space that receives at least a portion of a portable computer in the docking station, the first support member movable relative to the second support member to facilitate elevational movement of the display element relative to the second support member.

9. The display stand of claim 8, wherein the display element and the docking station wirelessly communicate with each other.

10. The display stand of claim 8, wherein the first support member is rotatably coupled to the second support member.

11. The display stand of claim 8, wherein the second support member comprises a horizontal support portion that forms one side of the L-shaped support member and a vertical support portion that forms another side of the L-shaped support member, the vertical support portion including two spaced apart support portions.

12. The display stand of claim 8, wherein the first and second support members are adapted to enable elevational movement of the display element relative to the portable computer.

* * * * *